(No Model.)

J. J. VOORHEES.
RUBBER PACKING RING OR GASKET.

No. 499,266. Patented June 13, 1893.

WITNESSES:

INVENTOR
John J. Voorhees,
BY
his ATTORNEYS.

UNITED STATES PATENT OFFICE.

JOHN J. VOORHEES, OF JERSEY CITY, NEW JERSEY.

RUBBER PACKING-RING OR GASKET.

SPECIFICATION forming part of Letters Patent No. 499,266, dated June 13, 1893.

Application filed March 10, 1893. Serial No. 465,466. (No model.)

*To all whom it may concern:*

Be it known that I, JOHN J. VOORHEES, residing at Jersey City, county of Hudson, State of New Jersey, have invented a new and useful Improvement in Rubber Packing-Rings or Gaskets, of which the following is a specification.

This invention relates to rubber or similar packing rings or gaskets.

The main object of the invention is to provide a construction whereby a ring or packing can easily be made of any desired size, and having a good joint between the meeting ends of the section of tubing of which the ring is made.

The invention consists of a rubber or other packing tube with a core of a canvas or other flexible part capable of being slipped along in the tube, and preferably readily cut, and in the combination of parts as hereinafter described and set forth in the claims.

Figure 1:
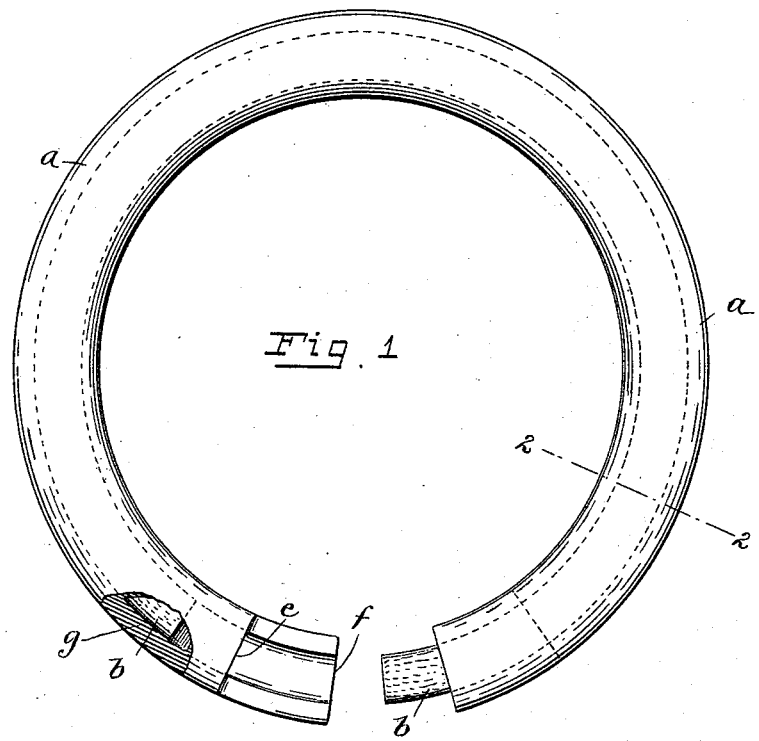
Figure 3:
Figure 2:
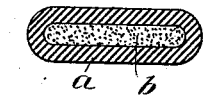

In the drawings Figure 1 is a side view of the ring with the ends of the tube disconnected. Fig. 2 is a section on line 2—2 of Fig. 1. Fig. 3 is an edge view of a ring complete and ready for use; and Fig. 4 illustrates a modification.

Figure 4:
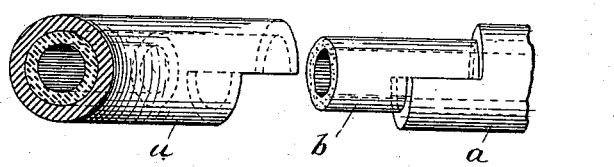

In making my packing material I form a long tube $a$, of rubber, or any substance suitable for packings, the tube, which may be of any suitable shape in cross section, containing throughout its length a continuous flexible core $b$, which is preferably a heavy canvas strip as shown in Figs. 1 and 2, but which may be of other form or flexible material, such as a tube of rubber, as shown in Fig. 4. I prefer to form the packing material in long lengths, so that rings of any desired circumference can be formed as wanted by cutting the material at the proper point. This cut is preferably made so as to form step portions $c$ $d$, adapted to overlap and fit each other, as shown in Fig. 3.

In cutting the packing from the long strip or coil, the material is cut on lines $e$ and $f$ from the opposite sides, and these cuts are connected on each side by longitudinal cuts. At the line $f$ the cut is extended through the core; this leaves the core exposed between lines $e, f$ on one of the ends formed by the cutting. This exposed end can be grasped and the core pulled along until it projects as shown at the right in Fig. 1. At the same time, of course, the opposite end of the core is drawn back into the tube as indicated at $g$. This leaves a socket into which the projecting end of the core can be inserted as shown in Fig. 3, to maintain the ends in line, and to form a convenient and satisfactory joint, when the packing ring is in use. The continuous core improves the ring, and is easily manipulated, as above described. I prefer to form the rubber tube around the core, in such manner that said parts will not adhere.

What I claim is—

1. A packing material consisting of a rubber or similar tube, containing a flexible core of material readily cut, said core being sufficiently loose within the tube to allow it to be pulled along when a section is cut of suitable length to form a packing ring, substantially as described.

2. A packing, consisting of a rubber or similar tube, in ring form, having a continuous flexible movable core projecting to form a tongue, at one of the meeting ends of the tube of which the ring is formed, said tongue being adapted to fit into the second of said meeting ends of the tube, whereby a strong packing and a good joint are provided, substantially as described.

3. A packing consisting of a tube in ring form, and of any suitable cross-section, the meeting ends of the tube being stepped, and a movable flexible core adapted to project from one stepped end of the tube, into the other end of the tube, whereby a good joint is formed, substantially as described.

JOHN J. VOORHEES.

Witnesses:
HARRY M. TURK,
CHARLES M. CATLIN.